United States Patent
Géhberger et al.

(10) Patent No.: US 12,040,936 B2
(45) Date of Patent: Jul. 16, 2024

(54) TECHNIQUE FOR CONNECTION HANDLING IN A DISTRIBUTED SYSTEM

(71) Applicant: Telefonaktiebolaget LM Ericsson (publ), Stockholm (SE)

(72) Inventors: Dániel Géhberger, Montréal (CA); Péter Mátray, Budapest (HU); Gabor Nemeth, Budapest (HU); Balázs Pinczel, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 482 days.

(21) Appl. No.: 17/420,522

(22) PCT Filed: Jan. 17, 2019

(86) PCT No.: PCT/EP2019/051110
§ 371 (c)(1),
(2) Date: Jul. 2, 2021

(87) PCT Pub. No.: WO2020/147952
PCT Pub. Date: Jul. 23, 2020

(65) Prior Publication Data
US 2022/0086037 A1    Mar. 17, 2022

(51) Int. Cl.
*H04L 41/0654* (2022.01)
*H04L 67/141* (2022.01)
*H04L 67/145* (2022.01)

(52) U.S. Cl.
CPC ........ *H04L 41/0654* (2013.01); *H04L 67/141* (2013.01); *H04L 67/145* (2013.01)

(58) Field of Classification Search
CPC .. H04L 41/0654; H04L 67/141; H04L 67/145
See application file for complete search history.

(56) References Cited

U.S. PATENT DOCUMENTS

| 7,577,749 B1 * | 8/2009 | Long | H04L 67/145 |
| | | | 709/218 |
| 2004/0224669 A1 * | 11/2004 | Pedlar | H04W 76/27 |
| | | | 455/403 |

(Continued)

FOREIGN PATENT DOCUMENTS

| CN | 109286593 B | * | 4/2021 | ........... H04L 63/061 |
| WO | 2019114970 A1 | | 6/2019 | |

OTHER PUBLICATIONS

Github, "Reconnecting TCP Socket Connections for Node.js Applications", online article, Sep. 12, 2017, pp. 1-3, retrieved on May 18, 2021, retrieved from internet: https://github.com/Cloud-Automation/node-net-reconnect.

(Continued)

*Primary Examiner* — Elton Williams
(74) *Attorney, Agent, or Firm* — COATS & BENNETT, PLLC

(57) ABSTRACT

A technique for application level based connection handling in a system comprising a plurality of distributed applications (302, 304) is disclosed. A method implementation of the technique is performed by a connection handling component (306) operating at application Level and providing an interface (310) towards a first application (302) of the plurality of distributed applications (302, 304) for establishing a connection with a second application (304) of the distributed plurality of applications (302, 304). The method comprises establishing, upon request of the first application (302) via the interface (310), a connection with the second application (304), and maintaining the connection on behalf of the first application (302) for communication between the first application (302) and the second application (304).

19 Claims, 6 Drawing Sheets

(56) References Cited

U.S. PATENT DOCUMENTS

2013/0024543 A1    1/2013  Thomas et al.
2013/0097304 A1*  4/2013  Asthana ................... G06F 9/50
                                                                         709/224

OTHER PUBLICATIONS

Apache Cassandra, "Failure detection and recovery", Online article, retrieved May 7, 2021, p. 1, retrieved from Internet: https://docs.datastax.com/en/archived/cassandra/2.1/cassandra/architecture/architectureDataDistributeFailDetect_c.html.

Kubernetes, "Pod Lifecycle", Online article, last modified Feb. 11, 2021, pp. 1-8, retrieved May 7, 2021, retrieved from Internet: https://kubernetes.io/docs/concepts/workloads/pods/pod-lifecycle/.

Nemeth, G. et al., "DAL A Locally-Optimizing Distributed Shared Memory System", HotCloud '17 Conference publication, Jul. 1, 2017, pp. 1-6, retrieved May 7, 2021, retrieved from Internet: https://www.usenix.org/system/files/conference/hotcloud17/hotcloud17-paper-nemeth.pdf.

Cooldoger, "Cassandra Gossip and Failure Detection", Online article, Oct. 30, 2016, pp. 1-3, retrieved on May 17, 2021, retrieved from Internet: https://www.cooldoger.com/2016/10/cassandra-gossip-and-failure-detection.html.

ETCD, "Failure modes", Online article, last modified Apr. 26, 2021, pp. 1-2, retrieved on May 17, 2021, retrieved from Internet: https://etcd.io/docs/v3.4/op-guide/failures/.

Apache Software Foundation, "Client Reconnection and Session Reattachment", Online article, retrieved on May 18, 20218, p. 1, retrieved from Internet: https://activemq.apache.org/components/artemis/documentation/1.0.0/client-reconnection.html.

IBM, "IBM MQ 7.5; Configuring IBM WebSphere MQ, Automatic client reconnection", last updated Apr. 16, 2021, pp. 306-312, retrieved on May 17, 2021, retrieved from Internet: https://www.ibm.com/docs/en/ibm-mq/7.5?topic=mq-websphere-75-pdf-documentation.

Openstack Docs, "Health Policy V1.0", Online post, last updated Apr. 10, 2019, pp. 1-6, retrieved on May 17, 2021, retrieved from Internet: https://docs.openstack.org/senlin/pike/contributor/policies/health_v1.html.

\* cited by examiner

TECHNIQUE FOR CONNECTION HANDLING IN A DISTRIBUTED SYSTEM

TECHNICAL FIELD

The present disclosure generally relates to the field of distributed systems. In particular, a technique for application level based connection handling in a system comprising a plurality of distributed applications is presented. The technique may be embodied in methods, computer programs, apparatuses and systems.

BACKGROUND

Distributed applications have been used for decades and have been getting increased attention in recent years as companies tend to shift their processing workloads to cloud based environments. Running distributed applications in the cloud generally turns out to be a challenging task as various failures, such as network failures causing network partitioning as well as node failures, can happen at any time. To deal with such situations, cloud based distributed systems must be designed to survive different kinds of random infrastructure and application failures.

Cloud environments nowadays provide various failure detection solutions for users. For example, in the open source software platform OpenStack, so called health policies can be used to detect virtual machine failures and can be configured to periodically check the health of applications. Similarly, in the open source container-orchestration system Kubernetes, so called liveliness and readiness probes can be used to periodically poll the status of so called pods and trigger actions in case of failures. Besides such platform level health monitoring, clustered applications, such as the distributed database system Cassandra, may have their own health monitoring solutions which typically operate a combination of heartbeat and gossip protocols to spread knowledge about the health of cluster members. Support for failure detection and automatic reconnection handling can also be provided on the level of network connections, e.g., by message queues on the lower network layers, for example.

If performance, especially latency, is a concern in a distributed system, as it is the case for virtualized telecommunication applications, for example, the reaction time of existing solutions in response to failures may not be sufficient, i.e., conventional systems may generally be too slow to react to critical failures. For example, the time granularity for OpenStack and Kubernetes monitoring solutions is on the seconds scale (usually between 5 to 10 seconds) and only works for user applications. The monitoring and recovery of entire physical nodes (e.g., OpenStack compute nodes) may even take minutes. Similarly, the failure detection mechanism of Cassandra operates by default in the 20 seconds time range. While such granularity may be sufficient for the monitoring of web applications, it may not be sufficient for more performance critical applications, such as applications on the telecommunication data plane or safety and industrial Internet of Things (IoT) applications, for example. If a failure of a telecommunication data plane node is recognized only after several seconds, for example, recovery may be significantly delayed. This may not only violate given service level agreements (SLAs) but, from a practical point of view, users may simply hang up a running call even before recovery could be started.

As distributed systems including the above orchestration systems for failure detection are typically built on top of the Transmission Control Protocol (TCP) protocol and the heart of these solutions is usually formed by a TCP connection setup timeout based retry loop, failure detection granularity may also not be sufficient at the level of network connections. This is because—while TCP can survive short network outages by buffering segments—It may not be appropriate for performance critical use cases as it may still take a considerable amount of time to detect failures at the network connection level.

SUMMARY

Accordingly, there is a need for a connection handling technique for use in distributed systems which avoids one or more of the problems discussed above, or other problems.

According to a first aspect, a method for application level based connection handling in a system comprising a plurality of distributed applications is provided. The method is performed by a connection handling component operating at application level and providing an interface towards a first application of the plurality of distributed applications for establishing a connection with a second application of the plurality of distributed applications. The method comprises establishing, upon request of the first application via the interface, a connection with the second application, and maintaining the connection on behalf of the first application for communication between the first application and the second application.

The connection may be established using a connectionless transport protocol. Maintaining the connection may include monitoring the connection to detect failures of the connection. Maintaining the connection may also include reestablishing the connection upon detection of a failure of the connection. Reestablishing the connection may include periodically sending reestablishment requests to the second application until the connection is reestablished in accordance with a period defined by one of a preconfigured value and a value calculated based on observed network conditions.

The connection handling component may support executing at least one trigger to provide application level feedback via the interface to the first application about events occurring in relation to the connection. The connection handling component may be included as a runtime component into the first application, wherein each of the at least one trigger may be implemented as a callback function provided by the runtime component via the interface. The method may further comprise executing, upon occurrence of an event relating to the connection, a trigger informing the first application of the event via the interface. The trigger may be executed when the first application has registered for the trigger with the connection handling component via the interface.

When the event relates to a reestablishment of the connection after a failure of the connection, the method may further comprise determining whether a reason for the failure of the connection was a network failure or a failure of one of the first application and the second application. Determining whether the reason for the failure of the connection was a network failure or a failure of one of the first application and the second application may include one of (1) determining that the reason for the failure of the connection was a network failure when, at the time of reestablishment after the failure of the connection, both the connection handling component and the second application were in a reconnecting state, (2) determining that the reason for the failure of the connection was a failure of the first application when, at the time of reestablishment after the failure of the connection, the connection handling component was in an initial connecting state and the second application was in a reconnecting state, and (3) determining that the reason for the failure of the connection was a failure of the second application when, at the time of reestablishment after the failure of the connection, the connection handling component was in a reconnecting state and the second application was in an initial connecting state. Whether the second application was in an initial connecting state or In a reconnecting state at the time of reestablishment after the failure of the connection, may be determined based on information included in a connection establishment related message received from the second application. Based on the determined reason, the event may be designated to be one of (1) a reconnected-after-network-failure event indicating that the connection has successfully been reestablished after a network failure between the first application and the second application, (2) a reconnected-after-first-application-failure event indicating that the connection has successfully been reestablished after a failure of the first application, and (3) a reconnected-after-second-application-failure event indicating that the connection has successfully been reestablished after a failure of the second application.

The method may further comprise denying a reestablishment request for the connection received from the second application when, upon detection of a failure of the connection, a request to close the connection was previously received from the first application via the interface. The event may be designated to be a sent-denial-message event indicating that a denial message has been sent to the second application denying a reestablishment request for the connection received from the second application. The method may further comprise receiving a denial message from the second application denying a reestablishment request for the connection sent by the connection handling component to the second application upon detection of a failure of the connection. The event may be designated to be a received-denial-message event indicating that a denial message has been received denying a reestablishment request for the connection sent by the connection handling component to the second application. The method may further comprise sending a notification about an event occurring in relation to the connection to an external system.

According to a second aspect, a computer program product is provided. The computer program product comprises program code portions for performing the method of the first aspect when the computer program product is executed on one or more computing devices (e.g., a processor or a distributed set of processors). The computer program product may be stored on a computer readable recording medium, such as a semiconductor memory, DVD, CD-ROM, and so on.

According to a third aspect, a computing unit configured to execute a connection handling component for application level based connection handling in a system comprising a plurality of distributed applications is provided. The connection handling component operates at application level and provides an interface towards a first application of the plurality of distributed applications for establishing a connection with a second application of the plurality of distributed applications. The computing unit comprises at least one processor and at least one memory, wherein the at least one memory contains instructions executable by the at least one processor such that the connection handling component is operable to perform any of the method steps presented herein with respect to the first aspect.

According to a fourth aspect, there is provided a system comprising a computing unit according to the third aspect.

BRIEF DESCRIPTION OF THE DRAWINGS

Implementations of the technique presented herein are described herein below with reference to the accompanying drawings, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 1:
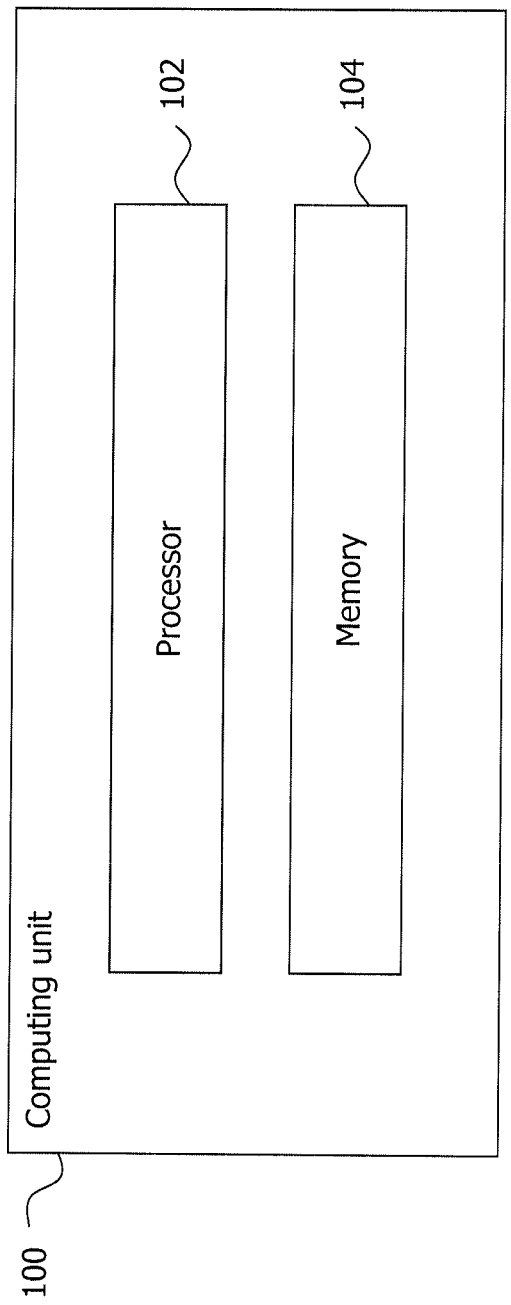
FIG. 1 illustrates an exemplary composition of a computing unit configured to execute a connection handling component according to the present disclosure.

FIG. 1 schematically illustrates an exemplary composition of a computing unit 100 configured to execute a connection handling component for application level based connection handling in a system comprising a plurality of distributed applications. The computing unit 100 comprises at least one processor 102 and at least one memory 104, wherein the at least one memory 104 contains instructions executable by the at least one processor 102 such that the connection handling component is operable to carry out the method steps described herein below with reference to the connection handling component.

It will be understood that the computing unit 100 may be implemented on a physical computing unit or a virtualized computing unit, such as a virtual machine, for example. It will further be appreciated that the computing unit 100 may not necessarily be implemented on a standalone computing unit, but may be implemented as components—realized in software and/or hardware—residing on multiple distributed computing units as well, such as in a cloud computing environment, for example.

Figure 2:
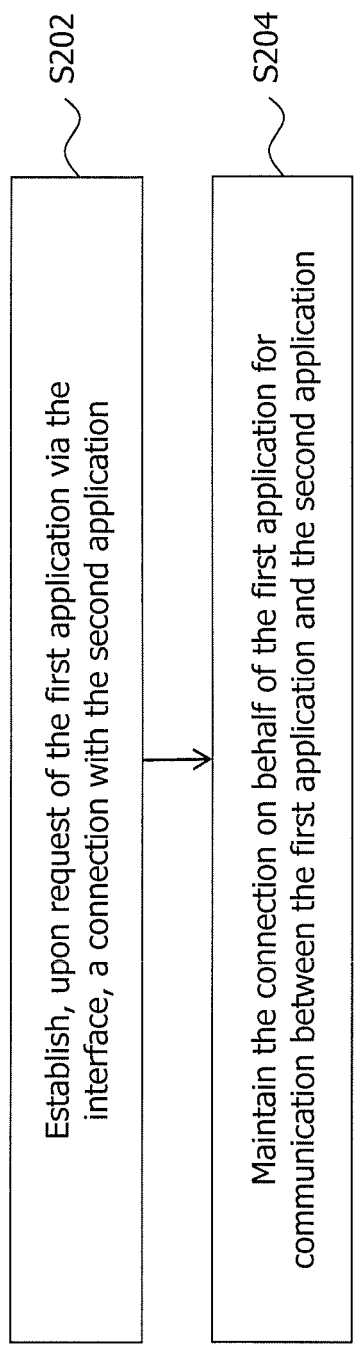
FIG. 2 illustrates a method which may be performed by the connection handling component according to the present disclosure.

FIG. 2 illustrates a method which may be performed by the connection handling component executed on the computing unit 100 according to the present disclosure. The method is dedicated to performing application level based connection handling in a system comprising a plurality of distributed applications. The connection handling component operates at application level and provides an interface to a first application of the plurality of distributed applications for establishing a connection with a second application of the plurality of distributed applications. In step S202, the connection handling component establishes, upon request of the first application via the interface, a connection with the second application and, in step S204, the connection handling component maintains the connection on behalf of the first application for communication between the first application and the second application.

As the connection handling component may operate at application level and may provide an interface to the first application at the application level (i.e., at the application layer, above the transport layer and the network layer in the protocol stack, and thereby at the same layer as the first application), the connection handling component may provide direct application level feedback on the status of the connection without the involvement of an orchestration system. Also, rather than a socket provided at operating system level, the connection handling component may operate one level higher and may maintain the connection between the first application and the second application at application level. The connection may thus be an application-to-application connection. The interface provided by the connection handling component to the first application may provide functions usable by the first application to open and close the connection and to send and receive data on the opened connection via the connection handling component. Actual connection establishment and maintenance on the transport layer and the network layer may be carried out by the connection handling component on behalf of the first application. The state of the connection may thus be managed by the connection handling component itself. The interface provided to the first application may be an Application Programming Interface (API), for example.

The connection handling component may be part of a communication subsystem in which every application of the plurality of distributed applications is provided with such a connection handling component. Similar to the connection handling component interfacing with the first application, a second connection handling component interfacing with the second application may thus provide functions to the second application equivalent to those provided to the first application by the first connection handling component interfacing with the first application. The first application and the second application may then communicate via the first connection handling component and the second connection handling component, wherein the first connection handling component and the second connection handling component may manage the state of the connection on their own. The first connection handling component and the second connection handling component may in other words together form a communication subsystem that manages the state of the connection between the first application and the second application itself. In the following description, when it is referred to connectivity with the second application, connectivity states of the second application and messages exchanged with the second application, such connectivity, states and messages may refer to the second connection handling component if such component is provided as a connection handling component interfacing with the second application.

As the connection handling component may detect connection failures itself, the connection may be established using a connection-less transport protocol, such as using a User Datagram Protocol (UDP) socket, using a custom protocol stack over the Data Plane Development Kit (DPDK), or using Remote Direct Memory Access (RDMA) unreliable datagram transport, for example. The use of connection-less transport protocol may generally provide for latency gains in failure detection times.

The connection handling component may support functionality for automatic health monitoring and connection reestablishment. Maintaining the connection may thus include monitoring the connection to detect failures of the connection. The state of the connection may be monitored periodically, e.g., using periodic heartbeat messages, wherein the periods may be selected in a manner to enable identifying connection failures within a short time, preferably within a few hundred milliseconds, for example. Maintaining the connection may also include reestablishing the connection upon detection of a failure of the connection, wherein reestablishing the connection may include periodically sending reestablishment requests to the second application until the connection is reestablished in accordance with a period defined by one of a preconfigured value (e.g., a simple constant) and a value calculated based on (previously) observed network conditions (e.g., a value calculated based on latency observed towards the first application). After detection of a failure, the connection handling component may periodically try to reestablish the connection, either until it succeeds or the connection is explicitly closed by the first application via the interface.

As said, via the interface, the connection handling component may provide functions to the first application for opening and closing the connection and sending and receiving data on the opened connection via the connection handling component. Upon request of the first application via the interface, the connection handling component may thus create and open (i.e., establish) the connection with the second application and, similarly, upon request of the first application via the interface, the connection handling component may close the connection. If the connection is healthy, the connection dose request may close the connection on both connection ends orderly, i.e., with no reconnection attempts taking place. If loss and/or reorder handling functionality is not provided by the underlying network technology, the connection handling component may also provide loss and/or reorder handling functionality for messages being exchanged between the first application and the second application.

Via the interface, the connection handling component may also provide functions to the first application for registering for one or more triggers that may be executed by the connection handling component upon occurrence of events in relation to the connection. A trigger, when executed, may correspond to a notification provided to the first application via the interface Informing the first application about occurrence of an event, such as about a status change in relation to the connection, for example. The connection handling component may thus support executing at least one trigger to provide application level feedback via the interface to the first application about events occurring in relation to the connection. The first application may include custom application logic to handle the triggers, wherein the first application may employ the same application logic or may employ different application logic for each of the supported triggers. While it will be understood that the connection handling component may be provided as a separate component at application level (executed at the same node as the first application), in one implementation, the connection handling component may be incorporated as a library into the binary of the first application, wherein triggers may be realized as callback functions. In other words, the connection handling component may be included as a runtime component into the first application, wherein each of the at least one trigger may be implemented as a callback function provided by the runtime component via the interface.

Due to the support of triggers, the method performed by the connection handling component may comprise executing, upon occurrence of an event relating to the connection, a trigger informing the first application of the event via the interface. The trigger may be executed (e.g., only) when the first application has registered for the trigger with the connection handling component via the interface. As such, the first application may not generally use all triggers supported by the connection handling component, but only those for which the first application registers. With each executed trigger, one or more parameters may be supplied to provide details on the occurred event, such as a time of the last incoming message in case of a connection failure or an identifier of the second application (e.g., an IP address of the node on which the second application is executed), for example.

As said, triggers supported by the connection handling component may signal information about events occurring in relation to the connection to the first application. For example, a trigger may be executed upon occurrence of a connection-is-open event, i.e., when the connection to the second application has successfully been opened. After this trigger, the first application may start sending and receiving data. If the connection handling component supports buffering of sent data fragments until the connection is successfully established, the first application may start sending data even before this trigger is executed. Another trigger may be executed upon occurrence of a connection-creation-failed event, i.e., when the establishment of the connection with the second application fails. This trigger may be executed only once, even if the connection handling component continues trying to connect after the trigger. Still another trigger may be executed upon occurrence of a connection-failed event, i.e., when a failure of the connection with the second application is detected. At this point, the first application may no longer send data to the second application. However, if the connection handling component supports buffering of sent data fragments until the connection is reestablished, it will be understood that the first application may also continue sending data at this point. Upon a connection-failed event, the connection handling component may enter a reconnecting state and attempt to reestablish the connection. Still another trigger may be executed upon occurrence of a connection-closed event, i.e., when the connection is explicitly closed by the first application, in which case a connection close request may be sent to the second application. If the connection is healthy, this message reaches the second application and so that the connection may be orderly closed on both ends.

Further triggers and events may be supported by the connection handling component to provide detailed application level feedback enabling the first application to distinguish between network failures (e.g., network outages partitioning the network) and application failures (e.g., restarts of the first application and/or the second application or the whole nodes on which these applications are executed). In one such variant, when the event relates to a reestablishment of the connection after a failure of the connection, the method performed by the connection handling component may comprise determining whether a reason for the failure of the connection was a network failure or a failure of one of the first application and the second application. Determining whether a reason for the failure of the connection was a network failure or a failure of one of the first application and the second application may include one of the following determining steps and, based on the determined reason, the corresponding event may be designated as follows:

(1) When, at the time of reestablishment after the failure of the connection, both the connection handling component and the second application were in a reconnecting state, it may be determined that the reason for the failure of the connection was a network failure. In this case, the event may be designated to be a reconnected-after-network-failure event indicating that the connection has been successfully reestablished after a network failure between the first application and the second application. In other words, in case of a network partitioning taking place due to a network failure, a reconnecting state may be entered on both sides of the split and both sides may periodically try to reestablish the connection. As soon as the network issue gets resolved, the reestablishment succeeds and a trigger may be executed for the reconnected-after-network-failure event on both sides.

(2) When, at the time of reestablishment after the failure of the connection, the connection handling component was in an initial connecting state (i.e., in a state of orderly trying to connect for the first time, but not to reconnect after a failure) and the second application was in a reconnecting state, it may be determined that the reason for the failure of the connection was a failure of the first application. In this case, the event may be designated to be a reconnected-after-first-application-failure event indicating that the connection has successfully been reestablished after a failure of the first application. In other words, in case of a failure of the first application (e.g., due to a software failure or if the node on which the first application is executed restarts), the second application may try to reestablish the connection with the first application and, once the first application comes back online, the reconnection succeeds. At this point, a trigger may be executed for the reconnected-after-first-application-failure event by the connection handling component. In this case, the connection handling component may be associated with the failing application/node.

(3) When, at the time of reestablishment after the failure of the connection, the connection handling component was in a reconnecting state and the second application was in an initial connecting state, it may be determined that the reason for the failure of the connection was a failure of the second application. In this case, the event may be designated to be a reconnected-after-second-application-failure event indicating that the connection has successfully been reestablished after a failure of the second application. In other words, in case of a failure of the second application (e.g., due to a software failure or if the node in which the second application is executed restarts), the connection handling component may try to reestablish the connection with the second application and, once the second application comes back online, the reconnection succeeds. At this point, a trigger may be executed for the reconnected-after-secondapplication-failure event by the connection handling component. In this case, the connection handling component may be associated with the healthy application/node.

While the connection handling component may have recorded whether it was, at the time of reestablishment after the failure of the connection, in an initial connecting state or in a reconnecting state and may thus have knowledge of its connectivity state itself, the connection handling component may obtain the same information for the second application from the second application. In one variant, therefore, whether the second application was in an initial connecting state or in a reconnecting state at the time of reestablishment after the failure of the connection, may be determined based on information included in a connection establishment related message received from the second application, for example. The connection establishment related message may be a connection creation request received from the second application which includes a flag indicating whether the second application is reconnecting or connecting for the first time, for example.

Still further triggers and events may be supported by the connection handling component to deny reconnection attempts of previously removed applications/nodes to thereby keep consistency among the plurality of applications in the system. Such situations may occur when a network partitioning happens due to a network failure and when the first application decides, on one side of the partition, to terminate the connection by explicitly closing the connection through the interface without being able to communicate the connection close request to the second application due to the network petition. This may be the case when a separated node on which the second application is executed is removed from a clustered application, such as a distributed database, for example. If, after the explicit removal of the separated node, the network failure is resolved, the second application (not yet knowing that the connection has been closed) may try to reestablish the connection. As the connection has already been closed, the connection handling component may deny such reestablishment request, send a denial message to the second application, and execute a trigger for a sent-denial-message event. If the connection was terminated by the second application, on the other hand, and the connection handling component attempts to reestablish the (already closed) connection, the connection handling component may receive a denial message from the second application and execute a trigger for a received-denial-message event. In other words, the method performed by the connection handling component may comprise denying a reestablishment request for the connection received from the second application when, upon detection of a failure of the connection, a request to close the connection was previously received from the first application via the interface. The event may then be designated to be a sent-denial-message event indicating that a denial message has been sent to the second application denying a reestablishment request for the connection received from the second application. The method performed by the connection handling component may also comprise receiving a denial message from the second application denying a reestablishment request for the connection sent by the connection handling component to the second application upon detection of a failure connection. The request may then be designated to be a received-denial-message event indicating that a denial message has been received denying a reestablishment request for the connection sent by the connection handling component to the second application.

Similar to executing a trigger upon occurrence of an event relating to the connection to inform the first application via the interface, the connection handling component may also send a notification about an event occurring in relation to the connection to an external system, such as an orchestration system or an alarm handling system on another node, for example. The information conveyed with the notification may correspond to the information conveyed with at least one of the triggers described above.

Figure 3:
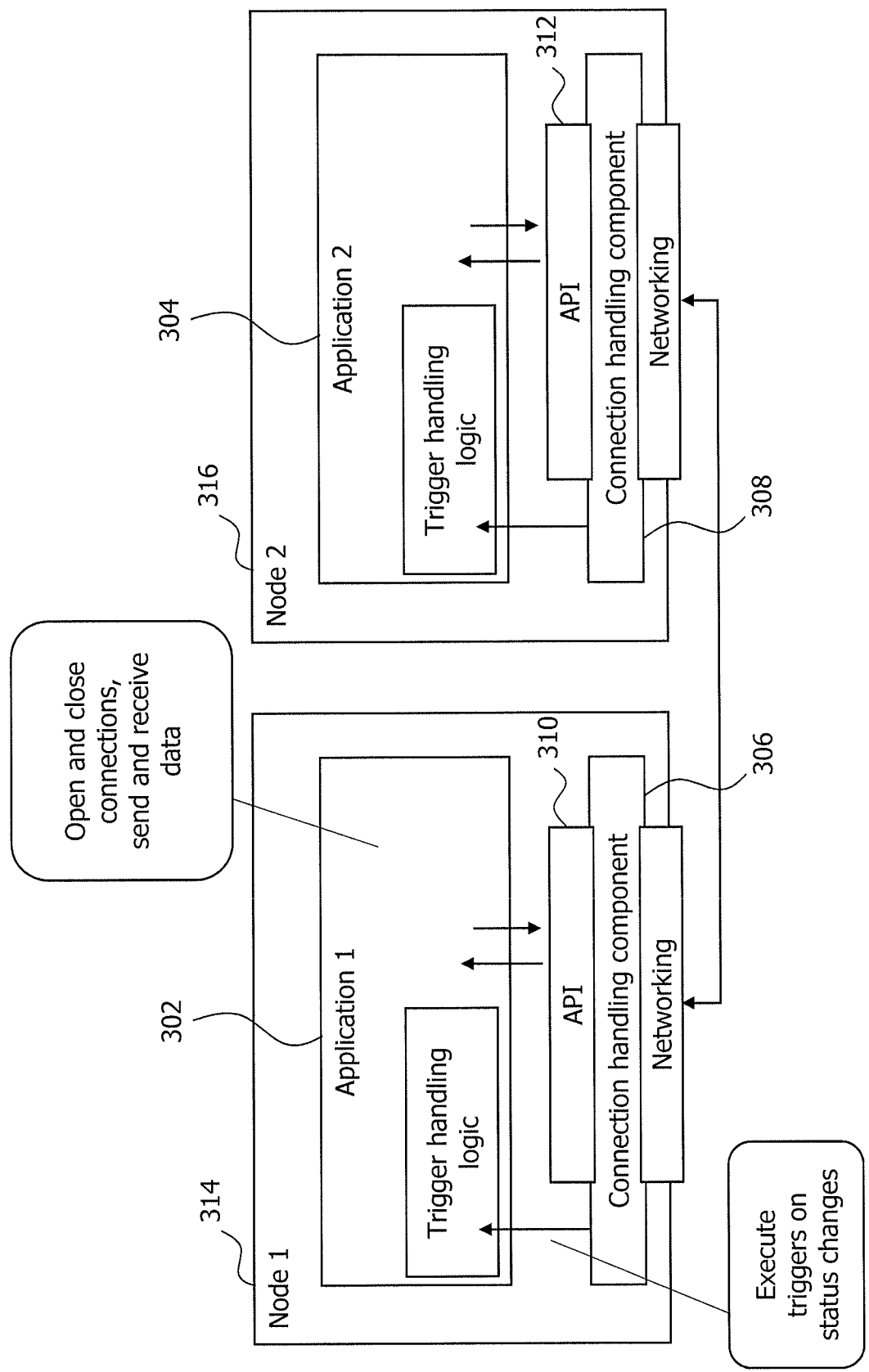
FIG. 3 illustrates an exemplary distributed system comprising a plurality of distributed applications including the connection handling component according to the present disclosure.

FIG. 3 illustrates an exemplary distributed system comprising a plurality of distributed applications which, in the shown example, are represented by a first application 302 and a second application 304. As shown in the FIGURE, the first application 302 interfaces with a first connection handling component 306 and the second application 304 interfaces with a second connection handling component 308, wherein the first connection handling component 306 and the second connection handling component 308 form a communication subsystem which manages the connection between the first application 302 and the second application 304, i.e., on behalf of the first and second applications 302 and 304, as described above. The interfaces between the first and second applications 302 and 304 and the connection handling components 306 and 308, respectively, correspond to APIs and are denoted by reference numerals 310 and 312 in the FIGURE. As indicated in the FIGURE, the first application 302 may use functions provided by the API 310 to open and close connections and to send and receive data on the opened connection via the connection handling component 306. Also, upon occurrence of events in relation to a connection established between the first application 302 and the second application 304, the connection handling component 306 may execute one or more triggers via the API 310 to inform the first application 302 about the occurrence of the event, as 1o described above. The same behavior may be provided between the second application 304, the API 312 and the connection handling component 308. In the shown example, the first application 302 is executed on a first node 314 and the second application 304 is executed on a second node 316. The first and second nodes 314 and 316 may correspond to computing units, such as the computing unit 100 described above, for example.

Figure 4:
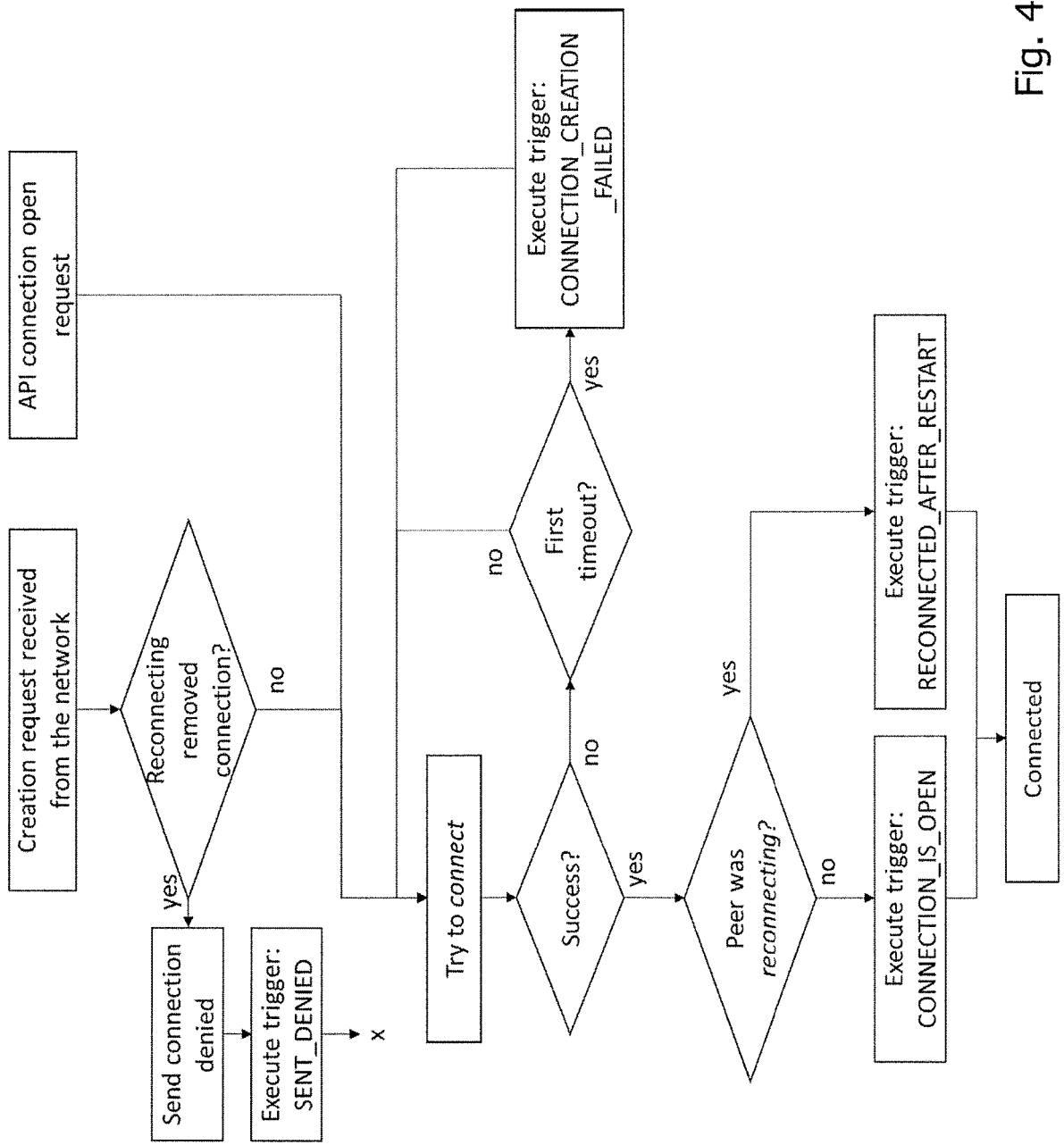
FIG. 4 illustrates an exemplary connection establishment procedure which may be performed by the connection handling component according to the present disclosure.

FIG. 4 illustrates an exemplary connection establishment procedure which may be performed by the connection handling component 306. In the FIGURE, the second application 304 is generally denoted as "peer" application. As shown, the creation of a new connection may either be initiated through the API 310 by the first application 302 or by a connection creation request received from the peer 304 through the network. If the connection creation is initiated through the network, it may be checked whether the incoming request is a reestablishment request and, if it is determined that the connection has previously been removed (i.e., closed) by the first application 302 through the API 310, a denial message may be sent to the peer 304 and a trigger may be executed for a sent-denied event (cf. "SENT_DENIED" in the FIGURE) by the connection handling component 306 to inform the first application 302 of the denial message being sent. After that, the connection creation may terminate.

If, on the other hand, it is determined that the connection has not previously been closed by the first application 302 or if the connection creation is triggered by the first application 302 through the API 310, the connection handling component 306 may repeatedly try to open the connection with the peer 304. If a first timeout occurs in the connection creation process, a trigger may be executed for a connection-creation-failed event (cf. "CONNECTION_CREATION_ FAILED" In the FIGURE) to inform the first application 302 that the connection could not be created immediately. In one variant, this timeout can be a fixed value (e.g., configured by the first application 302 and via the API 310) while, in more complex cases, the timeout may be set dependently on previously recorded delays in the network, for example.

If the connection creation is successful and if the connection creation request is received from the peer 304 through the network, the connection handling component 306 may check whether the peer 304 was in an initial connecting state or in a reconnecting state after a failure. This information may be indicated in a connection creation request received from the peer 304, e.g., by a flag indicating whether the peer 304 is connecting for the first time or reconnecting after a failure. In the former case, a trigger may be executed for a connection-is-open event (cf. "CONNECTION_IS_OPEN" in the FIGURE) and, in the latter case, a trigger may be executed for a reconnected-after-restart event (cf. "RECONNECTED_AFTER_RESTART" in the FIGURE). Finally, the connection may be opened and the first application 302 may start sending and receiving data fragments over the connection.

Figure 5:
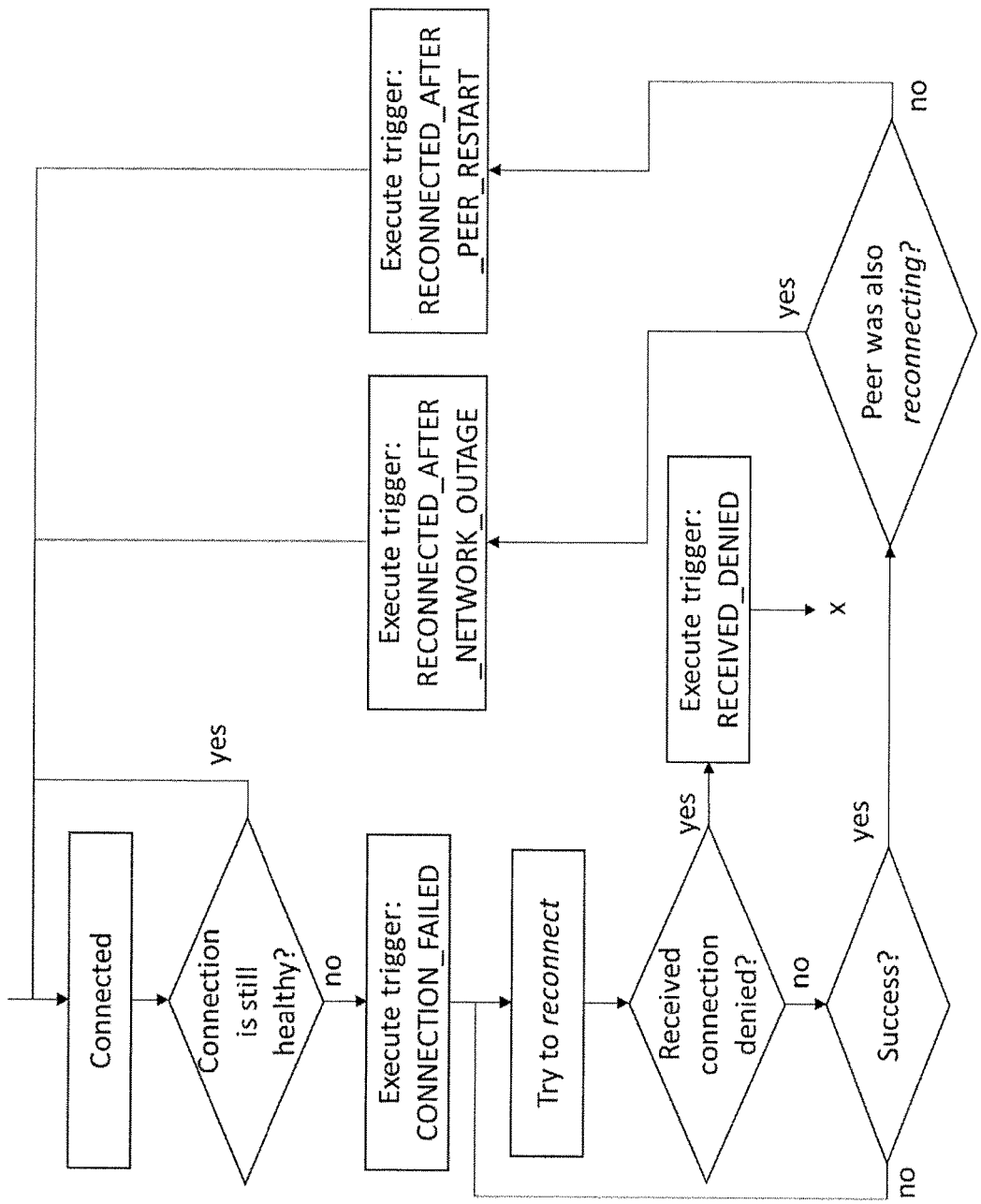
FIG. 5 illustrates an exemplary connection reestablishment procedure which may be performed by the connection handling component according to the present disclosure in case of a connection failure.

FIG. 5 illustrates an exemplary procedure which may be performed by the connection handling component 306 in case of a failure of the connection, such as when the connection becomes broken due to a network failure or a software or hardware error at the side of one of the applications 302 and 304. To detect a failure, the health of the connection may be periodically monitored by the connection handling component 306 and, upon detection of a connection failure, the connection handling component 306 may execute a trigger for a connection-failed event (cf. "CONNECTION_FAILED" in the FIGURE) and may enter a reconnecting state in which it tries to reestablish the connection by repeatedly sending reestablishment requests to the peer 304. The periodicity for the reestablishment requests may be defined as a constant value (e.g., configured by the first application 302 via the API 310) and, in other cases, the periodicity may be determined based on previously experienced network latencies, for example.

If a denial message is received from the peer 304 denying a reestablishment request sent from the connection handling component 306 (because the peer 304 may previously have closed the connection, without the connection handling component 306 knowing of the closed connection due to the connection failure), the connection handling component 306 may execute a trigger for a received-denied event (cf. "RECEIVED_DENIED" in the FIGURE) Indicating to the first application 302 that a denial message has been received from the peer 304 and, therefore, that the peer 304 has explicitly closed this connection previously.

If the connection reestablishment is successful, on the other hand, the connection handling component 306 may check if the peer 304 was in the initial connecting state or in the reconnecting state. As described above, this information may be obtained from the peer 304, e.g., through a flag included in a connection reestablishment request received from the peer 304 indicating whether the peer 304 connecting for the first time or reconnecting after a failure. In the former case, the connection handling component 306 may determine that an application failure occurred at the peer 304 (e.g., due to a restart of the node 316) and execute a trigger for a reconnected-after-second-application-failure event (cf. "RECONNECTED_AFTER_PEER_RESTART" in the FIGURE) and, in the latter case, the connection handling component 306 may determine that a network failure occurred and execute a trigger for a reconnected-after-network-failure event (cf. "RECONNECTED_AFTER_NETWORK_OUTAGE" in the FIGURE). In both cases, the connection is then open and the first application 302 can start sending and receiving data fragments again.

Figure 6:
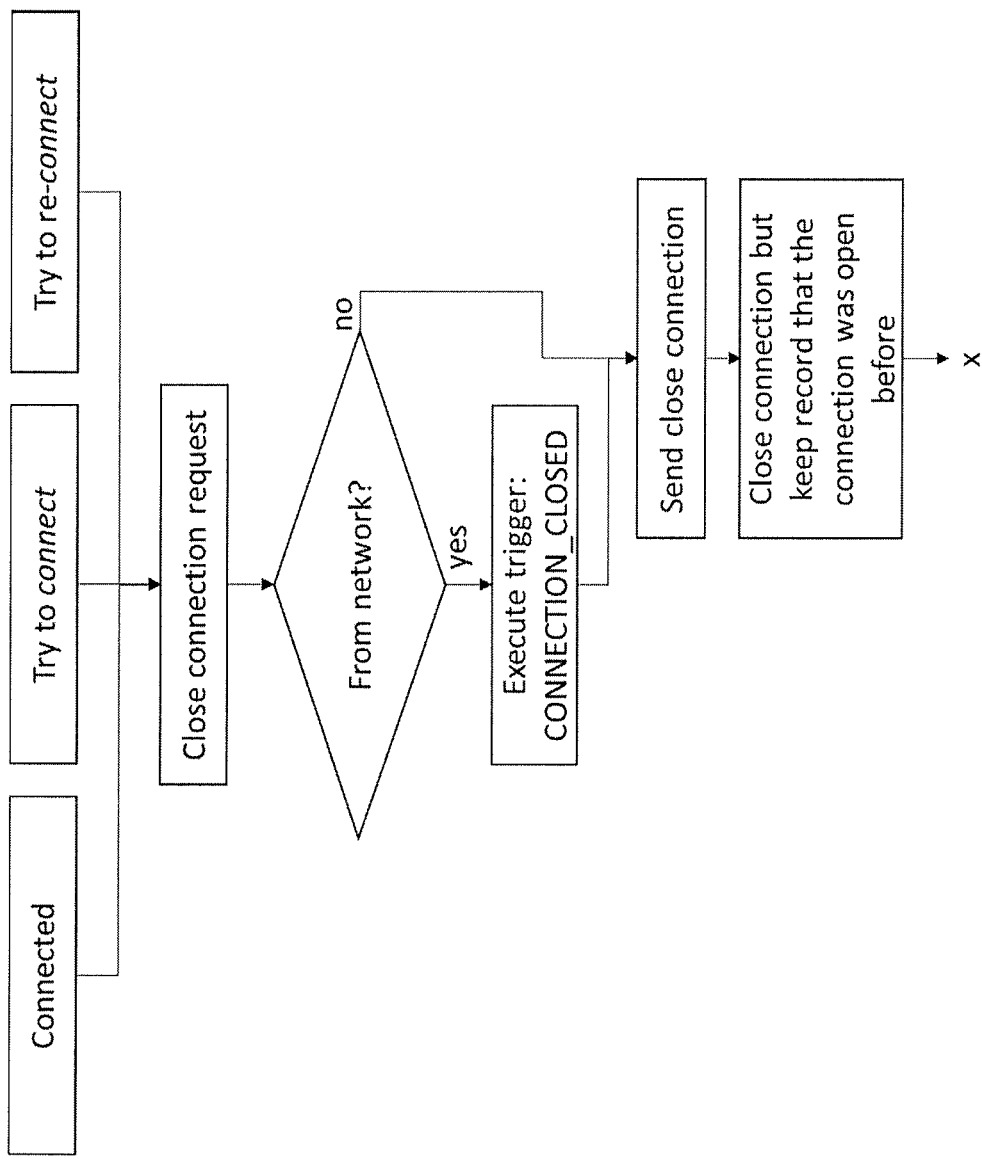
FIG. 6 illustrates an exemplary procedure for closing a connection which may be performed by the connection handling component according to the present disclosure.

FIG. 6 illustrates an exemplary procedure for closing a connection. As indicated in the FIGURE, a connection can be closed when the connection handling component 306 is in connected state, in the initial connecting state, or in the reconnecting state. The closing of the connection may either be requested by the first application 302 through the API 310 or by a close connection request received from the peer 304 over the network. In the latter case, the connection handling component 306 may execute a trigger for a connection-closed event (cf. "CONNECTION_CLOSED" in the FIGURE). In either case, the connection handling component 306 may send a close connection message to the peer 304 and record that the connection was open before. This information may be required to determine whether a denial message is to be sent upon a reestablishment request received from the peer 304 after a network failure, as described above.

As has become apparent from the above, the present disclosure provides a technique for application level based connection handling in a system comprising a plurality of distributed applications. The presented technique may enable providing fast and detailed application level feedback about network conditions and health of peer applications and nodes without the involvement of orchestration systems. The technique presented herein may thus be used to implement an own connection handling on top of connection-less protocols to achieve latency gains in failure detection times and to be able to provide value added information to the applications. Applications may react to failures in orders of magnitudes faster than with the conventional orchestration solutions mentioned above. Also, the presented technique may generally be implemented using different networking technologies.

Besides providing automatic reconnection handling, the connection handling component may distinguish network outages from application or node restarts and provide appropriate application level feedback to the applications, e.g., to trigger custom application level logic in the applications handling these failures. Also, reconnection of explicitly removed nodes can be denied at the transport level to help keeping the healthy instances of a cluster intact. Therefore, instead of signaling only the fact that a reconnection succeeded, the proposed technique may provide feedback on the particular issue which caused the connection outage (e.g., if it was a network or application failure), thereby enabling the applications to react appropriately. Various different triggers to the applications may be provided to this end. Also, notifications may be sent to external systems (e.g., orchestration or alarm handling systems) informing these systems about detected status changes accordingly.

While the technique presented herein may be employed in various use cases, two exemplary use cases will be described in the following to elucidate the potential of the proposed technique.

As a first example, the technique may be used to support operations of a distributed key-value database. In key-value database, data may be distributed between database nodes for scalability, load sharing and performance optimization. The database may store key-value pairs, meaning that keys may be used to get, set and delete values. In distributed key-value databases, algorithms may be necessary to determine the location of the values, e.g., using lookup tables or hash functions. The data stored in distributed key-value database systems may be replicated to ensure reliability (i.e., If one or more nodes fail, the full data set is still available by the replicas) and, after a failure, the replication factor of the affected values may need to be restored by creating replicas on healthy nodes.

In order to support the operations of such a distributed key-value database, the technique presented herein may be employed to assist the database in adopting to the continuously changing environment in a cloud, for example. To this end, when a trigger for a connection-failed event is executed, a database application may mark a given database instance as temporarily failed and may not try to send commands (e.g., get, set and delete) towards it. At this point, some requests may not be able to be serviced without replication. In the meantime, other database instances may continue to service commands. If, for example, a key with a replication factor of 3 has a replica on the failed node, a write command may still be issued and serviced by the other two healthy replicas and the outstanding replication may be buffered. If the node appears again after a network outage (reconnected-after-network-failure event), the outstanding commands may be sent towards it and, after this catch-up phase, the node may quickly become member of the database cluster again. However, if the node appears again after it restarted due to e.g. a software failure (reconnected-after-second-application-failure event), the backup may be discarded and the node may be added to the cluster as a new database instance and the replication factor of the related data elements may be restored accordingly. Further, if a node was partitioned away from the database cluster due to a network failure and it has explicitly been removed afterwards (i.e., the replication factor for all the keys may be restored), it may not be allowed to rejoin the cluster as it can ruin the state of healthy nodes. As a result, for a corresponding denial message being sent, a trigger for a received-denied event may be executed to restart the database instance so that it can join to the duster as a new member after the restart.

As a second example, the proposed technique may be used to support execution of distributed parallel algorithms. In case of distributed parallel algorithms, the problem space may generally be divided into sub-problems which can be individually solved by compute nodes in a cluster and the results computed by the individual nodes can then be combined to provide a result to the original problem. The well-known MapReduce algorithm in Hadoop is an example for such a framework.

In order to support execution of such a framework, the technique presented herein may be employed to optimize the work completion time if the framework experiences failures. For example, if a worker node disappears, the coordinating node may learn about the missing worker node by executing a trigger for a connection-failed event. In this case, the coordinator node may immediately assign a failed worker node's task to another node. If, after a short period, the previously missing worker node reappears and a trigger for a reconnected-after-network-failure event is executed on the coordinator node, the rescheduled job may be canceled and it may be waited for the original worker node to finish the task. If the node rejoins after a restart and a trigger for a reconnected-after-second-application-failure event is executed, the coordinator node may know that it can assign new tasks to the worker node, but there may be no need to cancel the rescheduled job.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for application level based connection handling in a system comprising a plurality of distributed applications, the method being performed by a connection handling component operating at an application layer above a transport layer and a network layer in a protocol stack and providing an interface towards a first application of the plurality of distributed applications for establishing a connection with a second application of the plurality of distributed applications, the method comprising:
  establishing, upon request of the first application via the interface, the connection with the second application;
  maintaining the connection on behalf of the first application for communication between the first application and the second application;
  executing, upon occurrence of an event relating to the connection, a trigger informing the first application of the event via the interface; and
  determining, when the event relates to a reestablishment of the connection after a failure of the connection, whether a reason for the failure of the connection was a network failure or a failure of one of the first application and the second application;
  wherein the trigger is executed when the first application has registered for the trigger with the connection handling component via the interface.

2. The method of claim 1, wherein:
  maintaining the connection comprises reestablishing the connection upon detection of a failure of the connection; and
  reestablishing the connection comprises periodically sending reestablishment requests to the second application until the connection is reestablished in accordance with a period defined by either a preconfigured value or a value calculated based on observed network conditions.

3. The method of claim 1, wherein:
  the connection handling component supports executing at least one trigger to provide application layer feedback via the interface to the first application about events occurring in relation to the connection;
  the connection handling component is included as a runtime component into the first application; and
  each trigger to provide application layer feedback is implemented as a callback function provided by the runtime component via the interface.

4. The method of claim 1, wherein determining whether the reason for the failure of the connection was a network failure or a failure of one of the first application and the second application includes one of:
  determining that the reason for the failure of the connection was a network failure when, at a time of reestablishment after the failure of the connection, both the connection handling component and the second application were in a reconnecting state;
  determining that the reason for the failure of the connection was a failure of the first application when, at the time of reestablishment after the failure of the connection, the connection handling component was in an initial connecting state and the second application was in a reconnecting state; or determining that the reason for the failure of the connection was a failure of the second application when, at the time of reestablishment after the failure of the connection, the connection handling component was in a reconnecting state and the second application was in an initial connecting state.

5. The method of claim 1, wherein, based on the determined reason, the event is designated to be one of:
   a reconnected-after-network-failure event indicating that the connection has successfully been reestablished after a network failure between the first application and the second application;
   a reconnected-after-first-application-failure event indicating that the connection has successfully been reestablished after a failure of the first application; or
   a reconnected-after-second-application-failure event indicating that the connection has successfully been reestablished after a failure of the second application.

6. The method of claim 1, further comprising denying a reestablishment request for the connection received from the second application when, upon detection of a failure of the connection, a request to close the connection was previously received from the first application via the interface.

7. The method of claim 1, wherein the event is designated to be a sent-denial-message event indicating that a denial message has been sent to the second application denying a reestablishment request for the connection received from the second application.

8. The method of claim 1, further comprising receiving a denial message from the second application denying a reestablishment request for the connection sent by the connection handling component to the second application upon detection of a failure of the connection.

9. The method of claim 1, wherein the event is designated to be a received-denial-message event indicating that a denial message has been received denying a reestablishment request for the connection sent by the connection handling component to the second application.

10. A computing device configured to execute a connection handling component for application level based connection handling in a system comprising a plurality of distributed applications, the connection handling component operating at an application layer above a transport layer and a network layer in a protocol stack and providing an interface towards a first application of the plurality of distributed applications for establishing a connection with a second application of the plurality of distributed applications, the computing device comprising:
   at least one processor and at least one memory, the at least one memory storing instructions executable by the at least one processor whereby the connection handling component is configured to:
      establish, upon request of the first application via the interface, the connection with the second application;
      maintain the connection on behalf of the first application for communication between the first application and the second application;
      execute, upon occurrence of an event relating to the connection, a trigger informing the first application of the event via the interface; and
      determine, when the event relates to a reestablishment of the connection after a failure of the connection, whether a reason for the failure of the connection was a network failure or a failure of one of the first application and the second application;
   wherein the trigger is executed when the first application has registered for the trigger with the connection handling component via the interface.

11. The computing device of claim 10, wherein:
   to maintain the connection the connection handling component is configured to reestablish the connection upon detection of a failure of the connection; and
   to reestablish the connection the connection handling component is configured to periodically send reestablishment requests to the second application until the connection is reestablished in accordance with a period defined by either a preconfigured value or a value calculated based on observed network conditions.

12. The computing device of claim 10, wherein:
   the connection handling component supports executing at least one trigger to provide application layer feedback via the interface to the first application about events occurring in relation to the connection;
   the connection handling component is included as a runtime component into the first application; and
   each trigger to provide application layer feedback is implemented as a callback function provided by the runtime component via the interface.

13. The computing device of claim 10, wherein to determine whether the reason for the failure of the connection was a network failure or a failure of one of the first application and the second application the connection handling component is configured to determine that the reason for the failure of the connection was:
   a network failure in response to both the connection handling component and the second application being in a reconnecting state at a time of reestablishment after the failure of the connection;
   a failure of the first application in response to, at the time of reestablishment after the failure of the connection, the connection handling component being in an initial connecting state and the second application being in a reconnecting state; or
   a failure of the second application in response to, at the time of reestablishment after the failure of the connection, the connection handling component being in a reconnecting state and the second application being in an initial connecting state.

14. The computing device of claim 10, wherein, based on the determined reason, the event is designated to be one of:
   a reconnected-after-network-failure event indicating that the connection has successfully been reestablished after a network failure between the first application and the second application;
   a reconnected-after-first-application-failure event indicating that the connection has successfully been reestablished after a failure of the first application; or
   a reconnected-after-second-application-failure event indicating that the connection has successfully been reestablished after a failure of the second application.

15. The computing device of claim 10, wherein the connection handling component is further configured to deny a reestablishment request for the connection received from the second application in response to a request to close the connection being received from the first application via the interface previous to detection of a failure of the connection.

16. The computing device of claim 10, wherein the event is designated to be a sent-denial-message event indicating that a denial message has been sent to the second application denying a reestablishment request for the connection received from the second application.

17. The computing device of claim 10, wherein the connection handling component is further configured to receive a denial message from the second application denying a reestablishment request for the connection sent by the connection handling component to the second application upon detection of a failure of the connection.

18. The computing device of claim 10, wherein the event is designated to be a received-denial-message event indicating that a denial message has been received denying a reestablishment request for the connection sent by the connection handling component to the second application.

19. A non-transitory computer readable medium storing software instructions for application level based connection handling in a system comprising a plurality of distributed applications, wherein the software instructions, when run on one or more processors of a programmable computing device, control a connection handling component of the programmable computing device that operates at an application layer above a transport layer and a network layer in a protocol stack and provides an interface towards a first application of the plurality of distributed applications for establishing a connection with a second application of the plurality of distributed applications to:
- establish, upon request of the first application via the interface, the connection with the second application;
- maintain the connection on behalf of the first application for communication between the first application and the second application;
- execute, upon occurrence of an event relating to the connection, a trigger informing the first application of the event via the interface; and
- determine, when the event relates to a reestablishment of the connection after a failure of the connection, whether a reason for the failure of the connection was a network failure or a failure of one of the first application and the second application;
- wherein the trigger is executed when the first application has registered for the trigger with the connection handling component via the interface.

\* \* \* \* \*